(12) United States Patent
Cheong et al.

(10) Patent No.: US 9,374,424 B2
(45) Date of Patent: Jun. 21, 2016

(54) SYSTEM FOR MANAGING HOME APPLIANCES AND PUSH SERVICE METHOD THEREOF

(71) Applicant: LG Electronics Inc., Seoul (KR)

(72) Inventors: Wonhee Cheong, Seoul (KR); Kangwoon Cheon, Seoul (KR); Yanghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 363 days.

(21) Appl. No.: 14/027,742

(22) Filed: Sep. 16, 2013

(65) Prior Publication Data

US 2014/0081433 A1   Mar. 20, 2014

(30) Foreign Application Priority Data

Sep. 20, 2012   (KR) .................. 10-2012-0104729

(51) Int. Cl.
*G05B 15/02* (2006.01)
*H04L 29/08* (2006.01)
*H04L 12/18* (2006.01)
*H04L 12/28* (2006.01)
*H04L 29/06* (2006.01)

(52) U.S. Cl.
CPC .............. *H04L 67/125* (2013.01); *G05B 15/02* (2013.01); *H04L 12/1895* (2013.01); *H04L 12/2809* (2013.01); *H04L 12/2825* (2013.01); *H04L 67/26* (2013.01); *H04L 67/28* (2013.01); *H04L 69/28* (2013.01)

(58) Field of Classification Search
CPC  G05B 15/02; H04L 12/2809; H04L 12/2825; H04L 67/26; H04L 12/1895; H04L 67/28; H04L 67/125; H04L 69/28
See application file for complete search history.

(56) References Cited

U.S. PATENT DOCUMENTS

| | | | | |
|---|---|---|---|---|
| 8,295,990 B2* | 10/2012 | Venkatakrishnan | ... | G06Q 50/06 700/291 |
| 8,321,948 B2* | 11/2012 | Robinson | ................ | G06F 21/10 705/51 |
| 8,458,331 B2* | 6/2013 | Chauhan | ................. | H04L 67/26 709/225 |
| 8,565,928 B2* | 10/2013 | Venkatakrishnan | ... | G06Q 50/06 700/285 |
| 8,577,392 B1* | 11/2013 | Pai | ......................... | H04L 67/18 455/404.2 |
| 8,621,097 B2* | 12/2013 | Venkatakrishnan | ... | G06Q 50/06 709/224 |
| 8,775,848 B2* | 7/2014 | Venkatakrishnan | ... | G06Q 50/06 206/216 |
| 8,977,731 B2* | 3/2015 | Venkatakrishnan | ... | G06Q 10/06 700/286 |
| 9,098,555 B2* | 8/2015 | Bjork | .................. | G06F 11/3006 |
| 2005/0015462 A1* | 1/2005 | Lee | ..................... | H04L 12/2834 709/217 |
| 2010/0262650 A1* | 10/2010 | Chauhan | ................. | H04L 67/26 709/203 |
| 2011/0202195 A1* | 8/2011 | Finch | ..................... | G06Q 50/06 700/295 |
| 2011/0202293 A1* | 8/2011 | Kobraei | ................. | G06Q 50/06 702/62 |
| 2012/0331156 A1* | 12/2012 | Colpitts | .............. | H04L 12/2818 709/227 |
| 2013/0346511 A1* | 12/2013 | Park | ....................... | G06Q 10/10 709/206 |

FOREIGN PATENT DOCUMENTS

| | | |
|---|---|---|
| CN | 101198172 A | 6/2008 |
| CN | 102263776 A | 11/2011 |
| CN | 202422411 U | 9/2012 |

* cited by examiner

*Primary Examiner* — Charles Kasenge
(74) *Attorney, Agent, or Firm* — Dentons US LLP

(57) ABSTRACT

A system for managing home appliances can provide a push service with respect to status information of a home appliance. Further, push service can be stably implemented using a response message to a push message. This can allow home appliances to be managed efficiently.

16 Claims, 6 Drawing Sheets

SYSTEM FOR MANAGING HOME APPLIANCES AND PUSH SERVICE METHOD THEREOF

CROSS-REFERENCE TO RELATED APPLICATION

Pursuant to 35 U.S.C. §119(a), this application claims the benefit of earlier filing date and right of priority to Korean Application No. 10-2012-0104729, filed on Sep. 20, 2012, the contents of which is incorporated by reference herein in its entirety.

BACKGROUND OF THE DISCLOSURE

1. Field of the Disclosure

The present disclosure relates to home appliances and a system for managing the same, and particularly, to a system for managing home appliances using a network.

2. Background of the Disclosure

Electric appliances arranged at home (hereinafter, will be referred to as 'home appliances'), e.g., a refrigerator, a washing machine, an air conditioner, and etc., perform their own functions, thereby providing a user's convenience. In recent years, the home appliances form a home network, and a user can control the home appliances from a remote place through the home network. Under such configuration, the home appliances can be turned on/off even when a user is not at home. However, such control of the home appliances through the home network is limited to the own functions of the home appliances.

A device management technique means a technique to provide functions such as a user custom setting, remote management and update, with respect to various types of home appliances. The device management technique may be used for the purpose of manufacturing a product, initially-setting a product after purchase, updating with respect to errors, remotely-controlling a product, and etc.

As an application program in the mobile communication field and a standardization technique with respect to the service field, techniques defined in Open Mobile Alliance (OMA) are being used. Such OMA deals with mobile web, web browsing, Digital Rights Management (DRM) solution, Internet Protocol (IP) multimedia, device management, mobile broadcast, mobile-related document standardization, and etc., in order to accelerate an interoperability of mobile data service. Especially, according to standardization with respect to a device management technique in the OMA, update of firmware, software download, new service, error correction, and etc., are performed in a wireless manner.

SUMMARY OF THE DISCLOSURE

Therefore, an aspect of the detailed description is to provide a system for managing home appliances capable of providing a push service with respect to information on, for example, a preset status of a home appliance.

Another aspect of the detailed description is to provide a system for managing home appliances capable of stably executing a push service using a response message to a push message, and a push service method thereof.

To achieve these and other advantages and in accordance with the purpose of this specification, as embodied and broadly described herein, there is provided a system for managing home appliances, comprising: one or more home appliances which generate status information; and an appliance management device configured to generate a push message corresponding to at elast one status information among the status information, and to transmit the push message to an external terminal device.

The appliance management device may repeatedly transmit the push message a prescribed number of times, if a response message to the push message has not been received within a prescribed time.

The appliance management device may comprise a management portal configured to register the home appliance by receiving device information and registration information on the home appliance, and configured to generate the push message.

The appliance management device may further comprise an appliance management server configured to receive a management command with respect to the home appliance from the terminal device, and configured to manage the home appliance based on the management command.

The system for managing home appliances may further comprise a push server provided with the registration information and terminal information on the terminal device, the push server configured to transmit the push message to the terminal device.

According to another embodiment of the present invention, there is provided a system for managing home appliances, comprising: one or more home appliances which generate status information; a terminal device having an application program with respect to the home appliance, and configured to manage the home appliance using the application program; and an appliance management device configured to generate a push message corresponding to preset status information among the status information, configured to transmit the push message to the terminal device, and configured to monitor whether the terminal device has normally received the push message.

After receiving the push message, the terminal device may execute the application program and transmit a management command. Alternatively, after receiving the push message, the terminal device may execute a manipulation command included in the push message, without executing the application program.

To achieve these and other advantages and in accordance with the purpose of this specification, as embodied and broadly described herein, there is also provided a push service method of a system for managing home appliances, the method comprising: receiving device information and registration information on a home appliance, and registering the home appliance; receiving status information from the registered home appliance; determining whether the status information is specific status information; generating a push message based on the status information, if the status information is specific status information as a result of the determination; transmitting the push message to a registered terminal device; and determining whether the terminal device has normally received the push message.

In the step of determining whether the terminal device has normally received the push message, if a response message to the push message is transmitted within a prescribed time, it may be determined that the terminal device has normally received the push message.

Various advantages and benefits may be obtained.

Firstly, as home appliances are registered to the management system for management service, a user can easily monitor or control the home appliances from a remote place.

Secondly, the appliance management device can provide a push service with respect to, for example, specific status information of a home appliance, such as START, END and ERROR. This can enhance a user's convenience, system stability, and system operating efficiency.

Thirdly, push service can be stably implemented using a response message to a push message. This can enhance system stability and service stability.

Fourthly, even when the terminal device does not execute an appliance management application, specific status information can be provided to the terminal device using a push service. This can allow home appliances to be efficiently managed, and allow a user to easily manage the home appliances.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
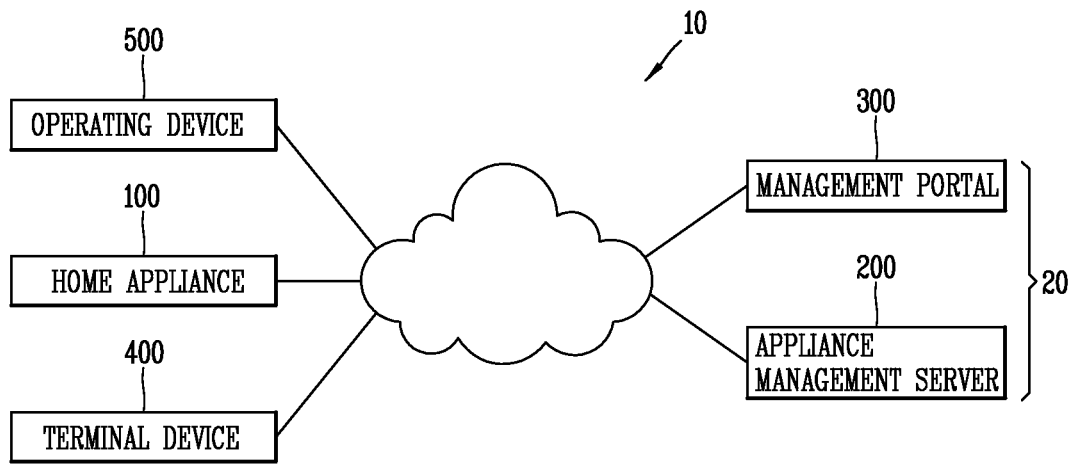
FIG. 1 is a view schematically illustrating a configuration of a system for managing home appliances according to an embodiment of the present invention.

Referring to FIG. 1, a system 10 for managing home appliances according to an embodiment of the present invention comprises one or more home appliances 100 and an appliance management device 20. The appliance management device 20 comprises an appliance management server 200 and a management portal 300. The system 10 for managing home appliances may further comprise a terminal device 400 and an operating device 500.

The home appliance 100 is provided with a display screen on which information can be inputted and outputted. The appliance management server 200 is connected to the home appliance 100 through a communication network between the appliance management server 200 and the terminal device 400, and manages the home appliance 100 according to a management command. The home appliance 100 generates a purchase list according to a designation command with respect to one or more products, and displays the purchase list on the display screen. The home appliance 100 may display, on the display screen, an accessible purchase site together with the purchase list. Then, the home appliance 100 may request for purchase of a corresponding product using the purchase site.

The home appliance 100 comprises a refrigerator, a washing machine, an air conditioner, a cooker, a cleaner, and etc., as an object to be managed. The home appliance 100 of the present invention may further comprise other devices such as communication devices. The home appliance 100 may comprise a hardware for performing functions of the home appliance, i.e., a home appliance module. And the home appliance 100 may be a smart home appliance for utilizing the home appliance module in various manners.

The appliance management server 200 is a device for executing a management service with respect to the home appliance 100. The appliance management server 200 comprises components configured to request for execution of a management command from the home appliance, and to receive an execution result of the management command, and to provide the execution result to a user.

The management portal 300 is a device for providing subscription and support service to a user of the home appliance 100. The management portal 300 comprises a function to manage an appliance user, and a function to execute authentication of a home appliance. The management portal 300 may be a device, a server or a service system operated by a manufacturer of the home appliance 100, or a seller of the home appliance 100.

The operating device 500 is used to allow access to a service provided from the management portal 300. For instance, the operating device 500 may be a personal computer having a network function and provided with a user interface. The operating device 500 may be also used to manage information on the home appliance 100, or information of a user.

The terminal device 400 is used to allow access to a management service with respect to the home appliance 100, the management service provided from the appliance management server 200. The terminal device 400 may use a management service through an Application Programming Interface (API) module provided from the appliance management server 200. The terminal device 400 is any electronic device which can use a management service with respect to the home appliance including a Device Management (DM) client, by accessing the appliance management server 200. For instance, the terminal device 400 may comprise a portable phone, a cellular phone, a smart phone, a Personal Digital Assistant (PDA), a Portable Multimedia Player (PMP), a tablet device, a computer, a multimedia device, and etc.

Figure 2:
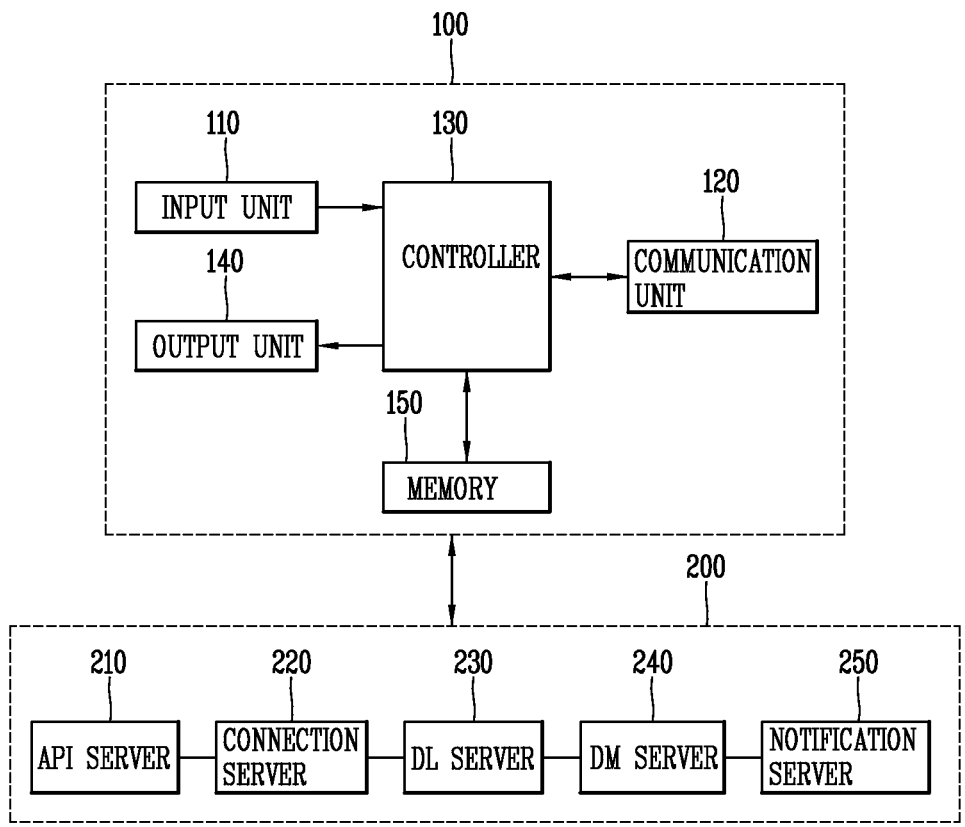
FIG. 2 is a block diagram schematically illustrating a configuration of home appliances and an appliance management device according to an embodiment of the present invention.

Referring to FIG. 2, the home appliance 100 comprises an input unit 110, a communication unit 120, a controller 130 and an output unit 140. The home appliance 100 may further comprise a memory 150.

The communication unit 120 is a communication module for transceiving (transmitting and receiving), with the appliance management server 200, a control message for execution of a management command, data required to perform a management command, a result on execution of a management command, and etc. The communication unit 120 may comprise a wireless or wired communication module for performing communication with the appliance management server 200. Especially, the wireless communication module is a module for performing communication with a short-range device, which may be a module for supporting a short-range communication technology such as Bluetooth, Radio Frequency Identification (RFID), Infra-Red Data Association (IrDA), Ultra Wideband (UWB), ZigBee, Wireless LAN (Bluetooth, 802.11n, and etc.).

The input unit 110 and the output unit 140 serve as a passage connected to a hardware of a home appliance (e.g., home appliance module), which correspond to a user interface. The input unit 110 and the output unit 140 operate so that a control signal and status information according to a management command can be transceived (transmitted and received). The home appliance 100 performs its own function, e.g., a washing function, a cooking function, a cleaning function or a storage function, according to a control command and a management command inputted through the input unit 110. The controller 130 may control a hardware of the home appliance 100 using a pre-stored application program, under control of a command input through the input unit 110. Then, the controller 130 may display a result thereof to the output unit 140.

The memory 150 may store therein a program for operating the controller 130, and may temporarily store therein input data and output data. The memory 150 may also store therein various software components. More specifically, the memory 150 may store therein an Operating System (OS), applications and a management platform. Alternatively, the memory 150 may store therein software components including a module which operates together with the communication unit, and a module which operates together with the input unit 110 and the output unit 140.

The memory 150 may comprise at least one storage medium of a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, a flash memory type, a hard disk type, a multimedia card micro type, a card type memory (e.g., Secure Digital (SD) memory, XD memory, and etc.). The memory 150 may be a network storage connected through the communication unit 120, or may be a region provided by a cloud service, and etc.

The operating system (OS) (e.g., LINUX, UNIX, OS X, WINDOWS, Chrome, Symbian, WinCE, Windows Mobile, iOS, Android, Bada, VxWorks, pSOS or other embedded operating system) may comprise various software components and/or drivers for controlling system tasks such as memory management and power management. The operating system may be changed through a firmware update procedure. The firmware update procedure may be performed based on a management command transmitted to a DM client from the terminal device 400, through a DM server inside the appliance management server. The management command for firmware update may be a command requesting for execution of an upgrade function.

The application program, a program executed on an operating system, comprise a program for an own function of a home appliance. More specifically, the controller 130 controls a home appliance (or a module provided in the home appliance) by executing the application program.

As an example, in a case where the home appliance 100 is a washing machine in which a hardware of a washing function is mounted, a control signal and a status collection signal are inputted through the input unit, the signals for managing a component of the washing machine such as a washing drum control unit, a washing water supply unit, a sensor unit, a detergent control unit, a vibration control unit or a horizontal status control unit. In this case, the control signal for managing a component of the washing machine is based on an application program instructing a washing method, and etc., according to a washing course. The washing course indicates a washing process, a rinsing process, a dehydration process, an order, a time duration, a number of times, and etc., based on information of a washing laundry such as a cloth.

As another example, in a case where the home appliance 100 is a refrigerator in which a hardware of a storage function is mounted, a control signal and a status collection signal are inputted through the input unit, the signals for managing a component of the refrigerator such as a cooling unit, a temperature control unit, a sensor unit or a power control unit. In this case, the control signal for managing a component of the refrigerator is based on an application program instructing a storage method, and etc., according to a storage mode, a maturation mode or a keeping mode.

The application program may be changed through a software update procedure. The software update procedure may be performed based on a management command transmitted to the DM client from the terminal device 400, through the DM server. The management command for software update may be a command requesting for execution of an upgrade function.

The management platform, a management program executed in an operating system, may comprise a DM client. The DM client transmits or receives a management message for managing the home appliance, to/from the DM server inside the appliance management server. Management functions executed by the DM client are with respect to a module mounted in the home appliance 100. For instance, the management functions include monitoring, diagnosis, upgrade, remote control, and etc.

The management platform may include a DM daemon. The DM daemon may receive a notification message for the DM client, the notification message transmitted through a notification server inside the home appliance. Also, the DM daemon may perform a function to process an exceptional item of the DM client.

The management platform may include a service agent. The service agent is used by the DM client when controlling a hardware inside the home appliance based on a management command, or when controlling a hardware by executing a controller application program. The controller 130 controls components of the home appliance. That is, the controller 130 controls the input unit 110, the communication unit 120, the output unit 140, the memory 150, the hardware, and etc. The controller 130 may be configured to execute software components stored in the memory 150. The controller 130 may control a home appliance module based on an application program. The controller 130 may execute or update an application program in order to perform a management command received from the appliance management server 200.

Referring to FIG. 2, the appliance management server 200 comprises at least one of an Application Programming Interface (API) server 210, a connection server 220, a download (DL) server 230, a device management (DM) server 240 and a notification server 250.

The API server 210 is an interface module for providing a device management service to an external terminal of the appliance management server 200 or an application program. More specifically, the API server 210 may include at least one of an interface function for checking whether a terminal to access a device management service or an application program has been allowed, an interface function for remote diagnosis of the home appliance 100, an interface function for control of an application program of the home appliance 100, and an interface function for control of a module of the home appliance 100.

The connection server 220 may transmit, to the home appliance 100, a management command request message received from an external terminal of the appliance management server 200. Then, the connection server 220 may transmit, to the appliance management server 200, a result on execution of a management command by the home appliance 100 (message transfer function).

The DL server 230 may transfer downloaded data to the home appliance 100. The DL server 230 may be a module for transferring downloaded data according to an OMA download standard.

The DM server 240 may request for execution of a management command, by transceiving a control message with the DM client which manages a device inside the home appliance 100. Then, the DM server 240 may receive an execution result on a management command. The DM server 240 may transceive messages for a management command according to an OMA DM standard.

The notification server 250 may perform a notification function to transceive a notification message for appliance management, with the home appliance 100. The notification server 250 may perform message exchange between the home appliance 100 and the DM server 240 in a push manner.

FIG. 2 illustrates that the appliance management server 200 is composed of five servers. The appliance management server 200 may be configured in a single device. In this case, the appliance management server 200 may be composed of a communication unit, a storage unit, a controller, and etc.

The communication unit performs communication with the home appliance 100 and the terminal device 400.

The storage unit may store therein a program for operating the controller, or may temporarily store therein input data and output data. Especially, the storage unit may store therein modules for transferring an execution request with respect to a management command received from the terminal device 400, and for receiving an execution result on the management command from the home appliance 100. More specifically, the storage unit may comprise at least one of an Application Programming Interface (API) module, a connection module, a download module, a device management module and a notification module.

The controller controls components of the appliance management server 200. That is, the controller controls the communication unit and the storage unit. The controller may be configured to execute modules stored in the storage unit.

Figure 7:
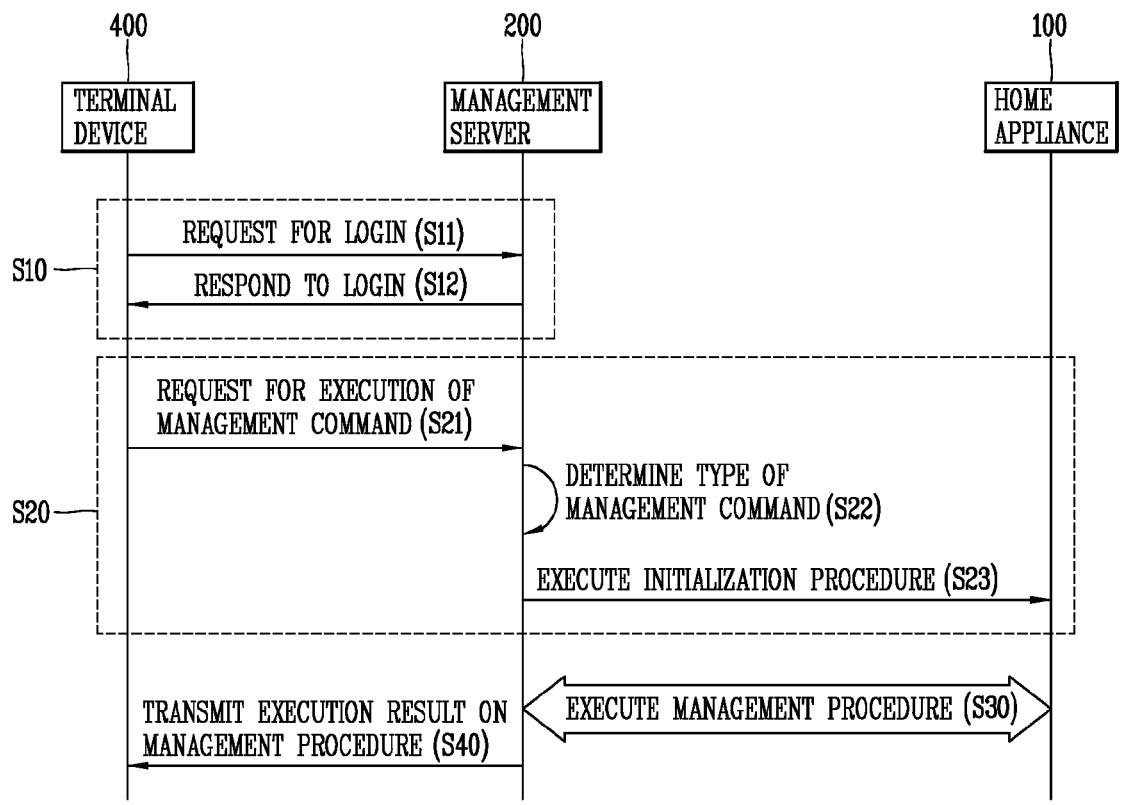
FIG. 7 is a flowchart schematically illustrating a method for managing home appliances by a system for managing home appliances according to an embodiment of the present invention.

Hereinafter, a method for managing home appliances by the system for managing home appliances according to an embodiment of the present invention will be explained with reference to FIG. 7. FIG. 7 is a flowchart schematically illustrating a method for the terminal device to transmit a management command to the home appliance through the appliance management server, and to receive an execution result.

The terminal device 400 transmits a management command request signal to the appliance management server 200 according to a user's input. The appliance management server 200 having received the management command request signal determines a type of a management command included in the management command request signal. Then, the appliance management server 200 determines a method to instruct a management command based on a determination result. The appliance management server 200 instructs the home appliance 100 to perform a management command according to the determined instruction method. Also, the appliance management server 200 transmits an execution result of the management command to the terminal device 400 if necessary.

Firstly, the appliance management server 200 checks whether the terminal device 400 is a proper device to request for a management command with respect to the home appliance 100 (S10). More specifically, the terminal device 400 transmits a login request message to the appliance management server 200 (S11).

The login request message may include information on authentication of application programs for managing the terminal device 400 or a device executed by the terminal device 400. The appliance management server 200 may provide an application programming interface (API) type interface for executing a management command with respect to the home appliance 100, based on an application program executed in an external device. The appliance management server 200 authenticates an application program for calling an interface, a device or a user, in order to call an interface by an authorized (allowed) application program or device. The login request message may be an authentication message which informs that the home appliance 100 can use an interface.

The appliance management server 200 checks authentication information included in the login request message, and transmits a check result on the authentication information. If the terminal device 400 or an application program executed in the terminal device 400 so as to perform device management is allowed to request for a management command from the appliance management server 200, the appliance management server 200 transmits a login response message to the terminal device 400 (S12).

The login response message may include access information necessary when the terminal device 400 requests for execution of a management command.

The access information may be access information of the appliance management server 200 for receiving a request for a realtime management command. For instance, the access information may be an IP address or a Transmission Control Protocol (TCP) port of the appliance management server 200.

Next, the terminal device 400 requests a management command from the appliance management server 200, and the appliance management server 200 determines a type of the management command. Then, the appliance management server 200 requests initialization for executing a management procedure from the home appliance 100, according to a result of the determination (S20). The appliance management server 200 may be configured to process a management command regardless of a type of the management command.

More specifically, the terminal device 400 accesses the appliance management server 200, thereby requesting for execution of a management command (S21). Then, the appliance management server 200 determines a type of the requested management command (S22).

Types of a management command may be categorized according to a transception scheme of a control message for executing a management command between the appliance management server 200 and the home appliance 100. For instance, a first type of management command indicates a method to request for execution of a management command and to transmit an execution result, by transceiving a control message based on an OMA DM standard. In the transception method according to an OMA DM standard, connection and release between the appliance management server 200 and the home appliance 100, for transception of a plurality of messages for a management command are performed in a repeated manner. Therefore, the first type of management command may correspond to a management command indicating a non-realtime characteristic.

A second type of management command indicates a method to request for execution of a management command and to transmit an execution result by transceiving a plurality of data packets through a connection state between the appliance management server 200 and the home appliance 100, i.e., a relay method through a connection-oriented session. The second type of management command may correspond to a management command indicating a realtime characteristic.

Whether a management command has a realtime characteristic or not may be determined based on whether there is a need to execute a management command within a prescribed time, after the appliance management server 200 or the home appliance 100 has received the management command. The appliance management server 200 may determine a type of a management command based on a type of an API used to request for execution of a management command. As another example, the appliance management server 200 may determine a type of a management command, based on a characteristic of connection between the terminal device 400 and the appliance management server 200 for request of a management command.

Then, the appliance management server 200 performs an initialization procedure for transferring the management command to the home appliance 100, based on a determination result on a type of the management command (S23).

Then, the appliance management server 200 requests the home appliance 100 to execute a management command, and transceives a control message for receiving an execution result, thereby executing a management procedure according to the management command (S30). The method to transceive a control message for device management in step S30 may be variable according to a type of a management command.

Then, the appliance management server 200 transmits, to the terminal device 400, an execution result on the management procedure (S40).

Figure 3:
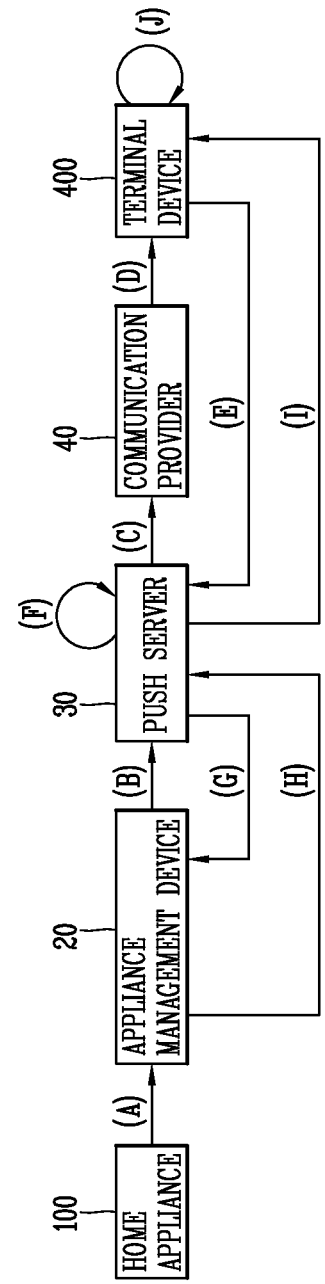
FIG. 3 is a view for explaining a push service method of a system for managing home appliances according to an embodiment of the present invention.

Referring to FIGS. 1 and 3, the system 10 for managing home appliances according to an embodiment of the present invention comprises one or more home appliances 100 which generate status information, and an appliance management device 20 configured to generate a push message corresponding to specific status information among the status information, and to transmit the push message to an external terminal device.

If a response message to the push message is not received within a prescribed time, the appliance management device 20 transmits the push message a prescribed number of times in a repeated manner. The prescribed time is a preset time, which may be set as several msec, 30 seconds, 1 minute, and etc. The prescribed number of times may be also preset as 3 times, 5 times, and etc.

The management portal 300 receives device information and registration information on the home appliance 100 to thus register the home appliance, and generates a push message. The push message is transmitted or received by an open API. The management portal 300 may include a storage unit, and the storage unit may store therein specific status information and a push message corresponding to the specific status information, in a patterned manner.

The specific status information is at least one of START, END and ERROR of a process of the home appliance 100. The home appliance 100 is at least one of a washing machine, a refrigerator, a cooker, an air conditioner and a cleaner. In case of a washing machine, a notification of 'TERMINATION OF PROCESS' may be performed using a push message after a process such as a washing process, a rinsing process and a dehydration process has ended. Alternatively, a notification of 'ERROR' may be performed with respect to an error occurring during a process, using a push message. In case of a cooker, a push message may be generated using specific status information such as a notification of 'FOOD TURNING', a notification of 'COMPLETION OF COURSE' and a notification of 'ERROR'.

As aforementioned, the appliance management server 200 receives, from the terminal device 400, a management command with respect to the home appliance 100. Then, the appliance management server 200 manages the home appliance 100 based on the management command.

Referring to FIG. 3, the system for managing home appliances further comprises a push server 30 provided with registration information and terminal information, the push server 30 configured to transmit a push message to the terminal device 400. The push server 30 may be configured in the appliance management device 20, but is preferably configured as an additional device. In a case where the push server 30 is included in the appliance management device 20, the appliance management device 20 may directly request for a push message to a communication provider 40. The communication provider 40 may be a server which provides android push notification service such as C2DM (Cloud to Device Messaging) service, GCM (Google Cloud Messaging) service, and apple notification service. That is, the communication server 40 is configured to transmit a push message to the terminal device 400 subscribed to the communication provider.

Referring back to FIGS. 1 to 3, a system for managing home appliances according to another embodiment of the present invention comprises one or more home appliances 100 which generate status information; a terminal device 400 having an application program with respect to the home appliance 100, and configured to manage the home appliance 100 using the application program; and an appliance management device 20 configured to generate a push message corresponding to preset status information among the status information, configured to transmit the push message to the terminal device, and to monitor whether the terminal device 400 normally receives the push message.

After receiving the push message, the terminal device 400 may execute the application program and transmit a management command. Alternatively, after receiving the push message, the terminal device 400 may execute a manipulation command included in the push message, without executing the application program.

If a response message to the push message is not received within a prescribed time, the appliance management device 20 transmits the push message a prescribed number of times in a repeated manner. The prescribed time is a preset time, which may be set as several msec, 30 seconds, 1 minute, and etc. The prescribed number of times may be also preset as 3 times, 5 times, and etc.

The appliance management device 20 comprises a management portal 300 configured to register the home appliance by receiving device information and registration information on the home appliance, and configured to generate a push message; and an appliance management server 200 configured to receive a management command with respect to the home appliance 100 from the terminal device 400, and configured to manage the home appliance 100 based on the management command.

The management portal 300 receives device information and registration information on the home appliance 100 to thus register the home appliance, and generates a push message. The push message is transmitted or received by an open API. The management portal 300 may include a storage unit, and the storage unit may store therein specific status information and a push message corresponding to the specific status information, in a patterned manner.

The appliance management server 200 receives, from the terminal device 400, a management command with respect to the home appliance 100. Then, the appliance management server 200 manages the home appliance 100 based on the management command.

The system for managing home appliances may further comprise a push server 30 connected to the management portal 300, provided with registration information and terminal information on the terminal device 400, the push server 30 configured to transmit a push message to the terminal device 400.

The specific status information is at least one of START, END and ERROR of a process of the home appliance 100. The home appliance 100 is at least one of a washing machine, a refrigerator, a cooker, an air conditioner and a cleaner. In case of a washing machine, a notification of 'TERMINATION OF PROCESS' may be performed using a push message after a process such as a washing process, a rinsing process and a dehydration process has ended. Alternatively, a notification of 'ERROR' may be performed with respect to an error occurring during a process, using a push message. In case of a cooker, a push message may be generated using specific status information, such as a notification of 'FOOD TURNING', a notification of 'COMPLETION OF COURSE' and a notification of 'ERROR'.

The terminal device 400 transceives (transmits and receives) a management command and an execution result on the management command, with the appliance management server 200, using Object Management Architecture Device Management (OMA DM) or a Transmission Control Protocol (TCP).

The terminal device 400 may execute an application program and transmit a management command after receiving the push message. The application program may be an application (app) installed in the terminal device 400, and may be implemented as an icon on a display screen of the terminal device 400. Upon execution of an application program, the terminal device 400 may transmit a management command (e.g., subsequent command according to content of the push message) to the appliance management server 200, and may receive an execution result on the management command, using OMA DM or TCP.

Figure 6:
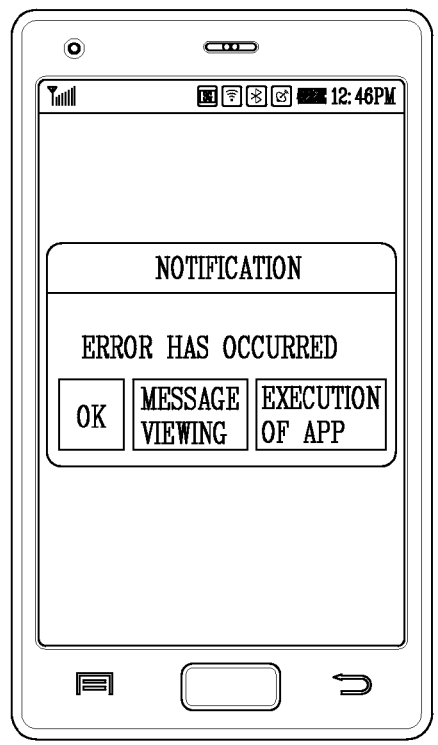

As shown in FIG. 6, in a case where the terminal device 400 has received a push message which reads 'Error has occurred' indicating occurrence of an error at the home appliance, buttons such as 'OK', 'Message Viewing' and 'App Execution' may be additionally displayed on the display screen of the terminal device 400, together with the push message. If a user presses the 'OK' button, the push message disappears from the display screen. If a user presses the 'Message Viewing' button, detailed information on the push message is displayed on the display screen. On the other hand, if a user presses the 'App Execution' button, the terminal device 400 executes an application program so that the system for managing home appliances can manage a corresponding home appliance.

Figure 5:
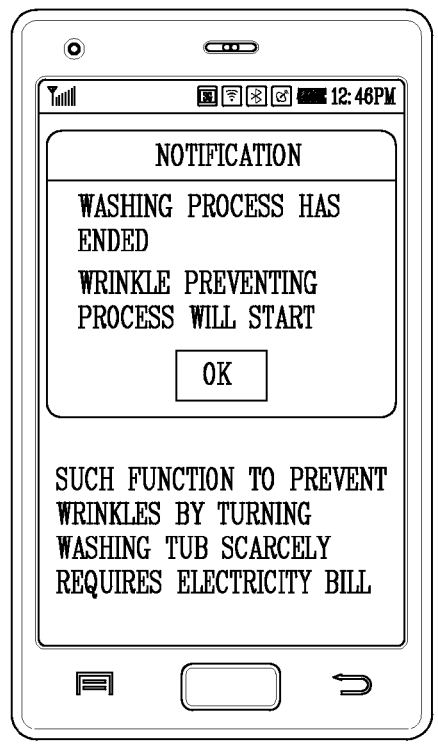

After receiving the push message, the terminal device 400 may execute a manipulation command included in the push message without executing an application program. Referring to FIG. 5, after a washing machine has ended a washing process, the appliance management device 20 transmits, to the terminal device 400, status information which reads 'Washing process has ended', in the form of a push message. If there is a subsequent process, a message which reads 'Wrinkle preventing process has started' may be included in the push message, and an 'OK' button may be displayed on the display screen of the terminal device 400. If a user taps the 'OK' button, the washing machine starts to perform a wrinkle preventing process. That is, the terminal device may provide a user with a management command with respect to a home appliance, without executing an application program.

Figure 4:
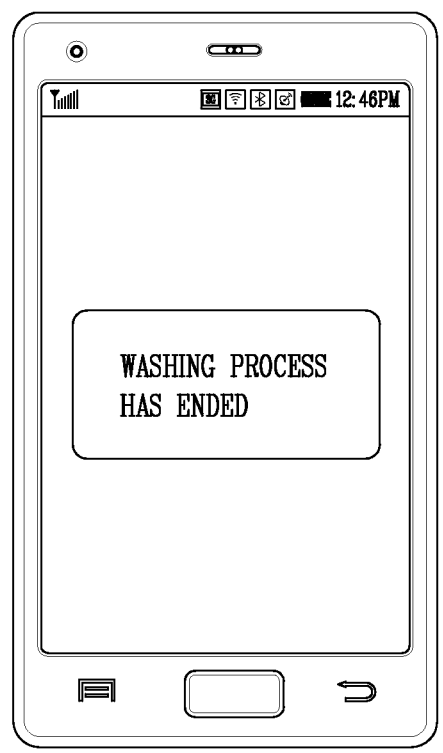
FIGS. 4 to 6 are views illustrating examples of push messages displayed on a terminal device according to an embodiment of the invention.

FIG. 4 illustrates a simple form of a push message. Such push message is displayed on the display screen of the terminal device 400 for a prescribed time, and then disappears. The push message merely informs status information which reads 'Washing process has ended'.

Figure 8:
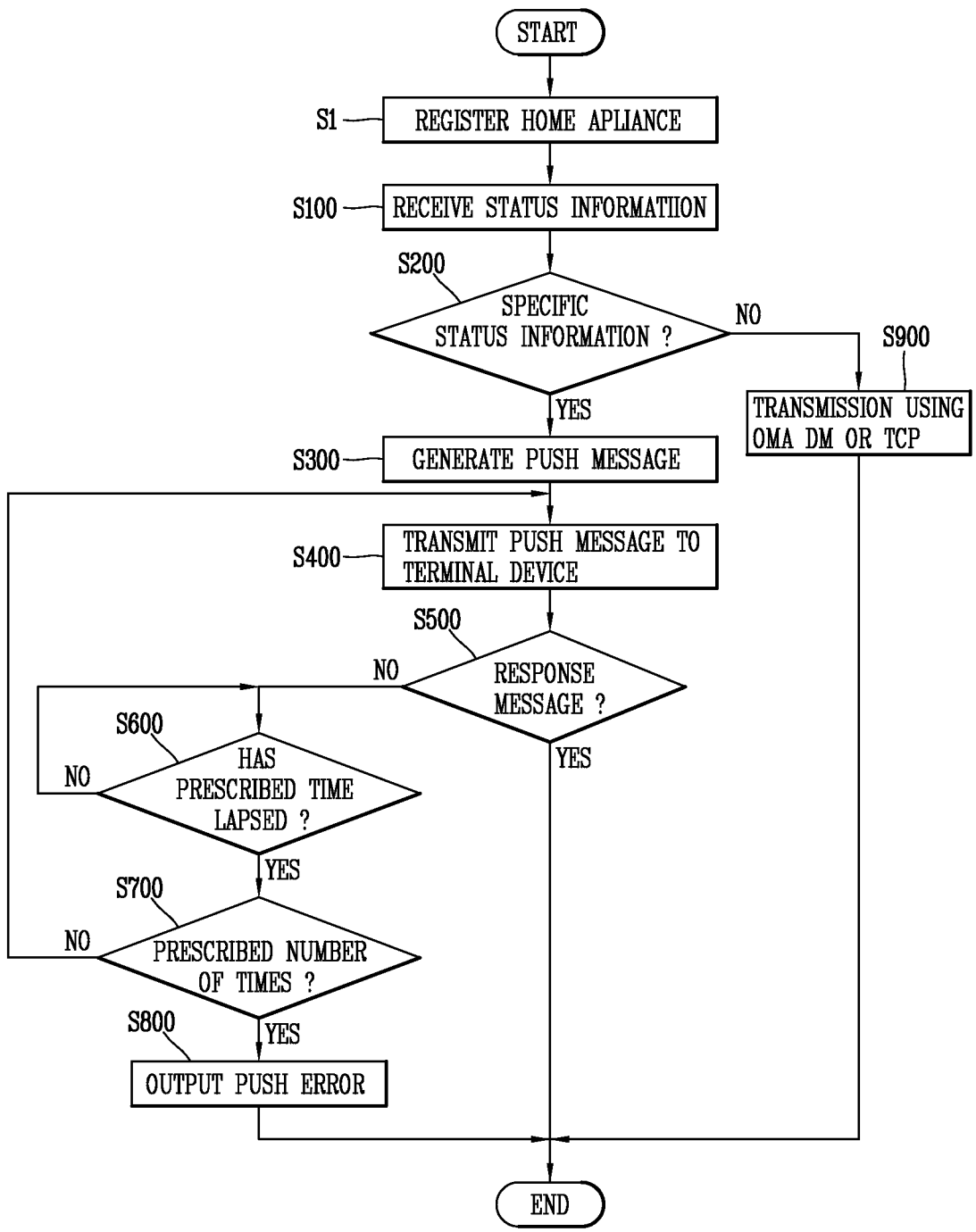
FIG. 8 is a flowchart schematically illustrating a push service method of a system for managing home appliances according to an embodiment of the present invention.

Referring to FIG. 8, a push service method of a system for managing home appliances according to an embodiment of the present invention comprises a step (S1) of receiving device information and registration information on a home appliance, and registering the home appliance; a step (S100) of receiving status information from the registered home appliance; a step (S200) of determining whether the status information is specific status information; a step (S300) of generating a push message based on the status information, if the status information is specific status information as a result of the determination; a step (S400) of transmitting the push message to a registered terminal device; and a step (S500~S800) of determining whether the terminal device has normally received the push message. In S500~S800, if a response message to the push message is transmitted within a prescribed time, it is determined that the terminal device has normally received the push message. Hereinafter, a configuration of a device will be understood with reference to FIGS. 1 to 3.

A push service method by the system for managing home appliances will be explained with reference to FIG. 3.

Firstly, if the home appliance 100 transmits specific status information to the appliance management device 20 (A) (S100, S200), the appliance management device 20 generates a push message (S300), and requests transmission of the push message from the push server 30 (B). The specific status information is at least one of START, END and ERROR of a process of the home appliance 100. The home appliance 100 is at least one of a washing machine, a refrigerator, a cooker, an air conditioner and a cleaner. In case of a washing machine, a notification of 'TERMINATION OF PROCESS' may be performed using a push message after a process such as a washing process, a rinsing process and a dehydration process has ended. Alternatively, a notification of 'ERROR' may be performed with respect to an error occurring during a process, using a push message. In case of a cooker, a push message may be generated using specific status information such as a notification of 'FOOD TURNING', a notification of 'COMPLETION OF COURSE' and a notification of 'ERROR'. The appliance management device 20 stores therein device information, registration information, etc. on the home appliance 100.

The push server 30 requests a server of the communication provider 40, to transmit the push message to the terminal device 400 (C). The push server 30 stores therein registration information and terminal information on the terminal device. The communication provider 40, requested to transmit a push message, transmits a push message corresponding to status information to the terminal device 400 (D) (S400). The push message is transmitted or received by an open API. The appliance management device 20 may store therein specific status information and a push message corresponding to the specific status information, in a patterned manner.

If the terminal device 400 has normally received the push message, the terminal device 400 transmits a response message to the push message, to the push server 30 (S500). That is, the terminal device 400 requests an ACK procedure from the push server 30 (E). The push server 30 updates a reception result on the response message, i.e., an ACK result (F). The push server 30 transmits the ACK result, to the appliance management device 20 (G). The push server 30 feedbacks the ACK result, to the terminal device 400 (I). Then, the terminal device 400 displays the push message on the display screen (J). The appliance management device 20 may reply whether it has received the ACK result or not, to the push server 30 (H).

In a case where the terminal device 400 has not normally received the push message ('NO' in S500), the operations (E-J) are not performed. If a response message to the push message has not been received within a prescribed time ('YES' in S600), the appliance management device 20 requests again the push server 30 to transmit the push message.

The push service method may further comprise repeatedly transmitting the push message a prescribed number of times (S700), if the terminal device 400 has not transmitted the response message within the prescribed time (S600). If the push message is transmitted more than a prescribed number of times, the appliance management device may output a 'push error'. The prescribed time is a preset time, which may be set as several msec, 30 seconds, 1 minute, and etc. The prescribed number of times may be also preset as 3 times, 5 times, and etc.

The system for managing home appliances and the push service method thereof according to the present disclosure can have the following advantages.

Firstly, as home appliances are registered to the management system for management service, a user can easily monitor or control the home appliances from a remote place.

Secondly, the present disclosure discloses a push service with respect to specific status information of a home appliance, such as START, END and ERROR.

Thirdly, push service can be stably implemented using a response message to a push message.

Fourthly, even when the terminal device does not execute an appliance management application, specific status information can be provided to the terminal device using a push service. This can allow home appliances to be managed efficiently.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A system for managing home appliances, comprising:
a home appliance to generate status information;
an appliance management device to generate a push message corresponding to specific status information among the status information generated by the home appliance, and to transmit the push message to an external terminal device, wherein the appliance management device comprises a management portal to register the home appliance by receiving device information and registration information, and generate the push message; and
a push server provided with the registration information and terminal information on the terminal device, wherein the push server transmits the push message to the terminal device,
wherein the terminal device requests an ACK procedure from the push server,
wherein the push server updates an ACK result, transmits the ACK result to the appliance management device, and feeds back the ACK result to the terminal device,
wherein the terminal device displays the push message after receiving the ACK result from the push server, and
wherein the specific status information is one of START, END, and ERROR of a process of the home appliance.

2. The system of claim 1, wherein the appliance management device repeatedly transmits the push message to the terminal device a prescribed number of times, if a response message to the push message has not been received within a prescribed time.

3. The system of claim 1, wherein the specific status information comprises a specific information, and the management portal comprises a storage unit to store therein the specific status information and the push message corresponding to the specific status information, in a patterned manner.

4. The system of claim 1, wherein the appliance management device further comprises an appliance management server to receive a management command with respect to the home appliance from the terminal device, and to manage the home appliance based on the management command.

5. The system of one of claim 1, wherein the push message is transmitted or received by an open Application Programming Interface (API).

6. A system for managing home appliances, comprising:
a home appliance to generate status information;
a terminal device having an application program to manage the home appliance using the application program;
an appliance management device to generate a push message corresponding to preset status information among the status information, to transmit the push message to the terminal device, and to monitor whether the terminal device has normally received the push message; and
a push server provided with terminal information on the terminal device, wherein the push server transmits the push message to the terminal device,
wherein the terminal device requests an ACK procedure from the push server,
wherein the push server updates an ACK result, transmits the ACK result to the appliance management device, and feeds back the ACK result to the terminal device,
wherein the terminal device displays the push message after receiving the ACK result from the push server, and
wherein the status information is one of START, END, and ERROR of a process of the home appliance.

7. The system of claim 6, wherein the appliance management device repeatedly transmits the push message to the terminal device a prescribed number of times, if the terminal device has not transmitted a response message to the push message to the appliance management device within a prescribed time.

8. The system of claim 6, wherein the appliance management device comprises:
- a management portal to register the home appliance by receiving device information and registration information on the home appliance, and to generate the push message; and
- an appliance management server to receive a management command with respect to the home appliance from the terminal device, and to manage the home appliance based on the management command,
- wherein the management portal comprises a storage unit to store therein the preset status information and the push message corresponding to the preset status information, in a patterned manner.

9. The system of claim 8, wherein the push server is connected to the management portal and provided with the registration information on the terminal device.

10. The system of claim 9, wherein the terminal device transceives the management command and an execution result on the management command, with the appliance management server, using Object Management Architecture Device Management (OMA DM) or a Transmission Control Protocol (TCP).

11. The system of claim 9, wherein after receiving the push message, the terminal device executes the application program and transmits the management command.

12. The system of claim 6, wherein after receiving the push message, the terminal device executes a manipulation command included in the push message, without executing the application program.

13. The system of one of claim 6, wherein the push message is transmitted or received by an open Application Program Interface (API).

14. A push service method of a system for managing home appliances, the method comprising:
- receiving by an appliance management device, device information and registration information on a home appliance, and registering the home appliance;
- receiving by the appliance management device, status information from the registered home appliance;
- determining by the appliance management device, whether the status information is preset status information;
- generating by the appliance management device, a push message based on the status information, if the status information is the preset status information as a result of the determination;
- transmitting by the appliance management device, the push message to a registered terminal device; and
- determining by the appliance management device, whether the terminal device has normally received the push message,
- wherein in the step of determining whether the terminal device has normally received the push message, if a response message to the push message is transmitted by the terminal device and received by the appliance management device within a prescribed time, it is determined that the terminal device has normally received the push message,
- wherein the terminal device transmits to a push server a response message to the push message when the terminal device normally receives the push message, a transmission comprising:
  - requesting by the terminal device, an ACK procedure from a push server,
  - updating by the push server, an ACK result,
  - transmitting by the push server, the ACK result to the appliance management device and the terminal device, and
  - displaying by the terminal device, the push message after receiving the ACK result from the push server,
- wherein the status information is one of START, END and ERROR of a process of the home appliance.

15. The method of claim 14, further comprising repeatedly transmitting by the appliance management device, the push message a prescribed number of times, if the terminal device has not transmitted the response message within the prescribed time.

16. The method of claim 15, wherein the push message is transmitted or received by an open Application Program Interface (API).

* * * * *